Figure 1B:
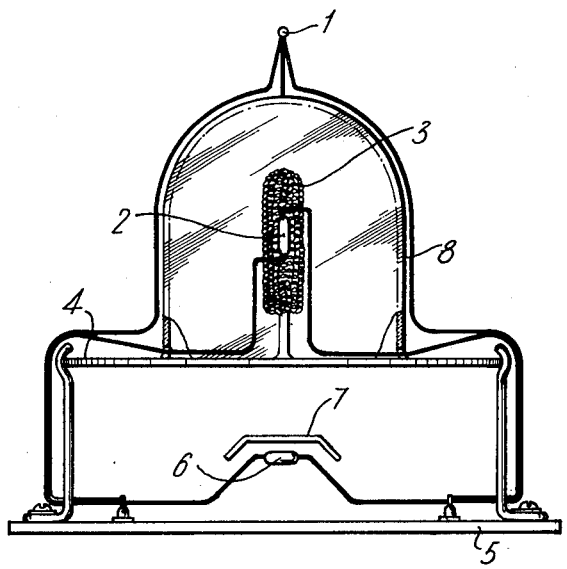

United States Patent [19]

MacHattie et al.

[11] 4,073,190
[45] Feb. 14, 1978

[54] COLD STRESS METER

[76] Inventors: Lloyd E. MacHattie, 105 Banstock Drive, Willowdale, Ontario, Canada, M2K 2H7; Lorne A. Kuehn, 65 Clayhall Cres., Downsview, Ontario, Canada, M3J 1W6

[21] Appl. No.: 725,260

[22] Filed: Sept. 21, 1976

[30] Foreign Application Priority Data

Sept. 23, 1975 Canada .................................. 236085

[51] Int. Cl.² ........................... G01K 1/00; G01K 3/00
[52] U.S. Cl. .................................... 73/339 C; 73/344; 73/362 SC
[58] Field of Search ................ 73/339 C, 344, 362 R, 73/362 AR, 362 SC, 170 R

[56] References Cited

U.S. PATENT DOCUMENTS 3,954,007  5/1976  Harrigan ..................... 73/339 C X

FOREIGN PATENT DOCUMENTS 49 of  1914  United Kingdom .............. 73/339 C

OTHER PUBLICATIONS

Penman et al., *A Portable Thermistor Bridge for Micrometeorology Among Growing Crops,* 3-1949.

*Primary Examiner*—Richard C. Queisser
*Assistant Examiner*—Charles Gorenstein
*Attorney, Agent, or Firm*—Laff, Whitesel & Rockman

[57] ABSTRACT

The instrument comprises means for measuring the ambient air temperature and providing a first signal proportional to the temperature, means for providing a second signal proportional to the non-evaporative rate of body heat loss in K Cal./m²hr, and means for providing a third signal representative of the thermal insulation resistance of still air outside of clothing. Means is also included for measuring the fraction of full sunlight intensity reaching a person wearing the clothing, and for providing a fourth signal representative thereof, and further means for providing a fifth signal representative of the absorptance of the clothing. Further means adds the first signal to the product of the second and third signals and to the product of 230 and the third, fourth and fifth signals and substracts the product of 0.18 and the second signal, and provides an output signal, which is representative of the still shade temperature.

13 Claims, 4 Drawing Figures

COLD STRESS METER

This invention relates to an instrument for measurement of the still shade temperature, which provides a measurement for the effects on body heat loss, of sun, wind, and air temperature.

Where persons are required to function in a cold environment, it is important to know how much clothing should be worn and whether there is danger of frostbite, and to what degree. The "wind chill index" is a value which combines the ambient temperature and wind velocity to obtain a numerical value, which is intended to be a measure of the rate of heat loss from exposed human skin. While the resulting number is not considered to represent the actual heat loss rate in KCal/m²hr., it does constitute a basis on which to locate thresholds or ranges of severity of stress.

It should be noted that the wind chill index applies to bare skin and does not allow for the effect of clothing, nor for the effect of radiation exchange with the environment.

In the publication "Man in a Cold Enviroment", by A. C. Burton and O. G. Edholm, Chapter 7, London, Edward Arnold 1955, a "still shade temperature" scale was proposed to take account of the aforenoted effects. The wind affects the thermal insulation of the air layer which clings to the outside of clothing, changing its effective thickness by amounts which have been determined experimentally. Burton showed that the effects of introducing wind or sunshine on the man's rate of heat loss were the same as that of changing the ambient temperature by appropriate amounts, and could thus be expressed in terms of an equivalent decrement or increment in that temperature. As a result, any dry environmental condition could be reduced to one giving an equal rate of heat loss in still air with no radiation exchange, in which the ambient temperature was replaced by the still shade temperature.

It should be noted that the still shade temperature is not the same for everyone, but depends on a person's metabolic rate and on that person's clothing absorptance (the fraction of the incident solar radiant energy which is absorbed and turned into heat).

The present invention concerns the design of a portable direct-reading battery operated instrument for the measurement of still shade temperature. The instrument measures, and provides the value $T_{ss}$, the still shade temperature, which, when expressed in degrees Celsius, is given by $$T_a - 0.18H + HI_a + 230\tau\alpha I_a$$

where $T_a$ = the ambient temperature in degrees celsius, $H$ is the non-evaporative rate of body heat loss in KCal/m²hr. (about ¾ of metabolic rate where there is no active sweating), $I_a$ is the thermal insulation resistance of still air outside of clothing in degrees C m²hr/KCal (which has the value of 0.18 in still air but gets progressively smaller the higher the wind velocity), $\tau$ is the fraction of full sunlight intensity reaching the subject, and $\alpha$ is the absorptance of clothing.

The still shade temperature measuring instrument which is the subject of this invention comprises a bead transistor having a surface of reflective material, mounted for exposure to the sun and wind. A single semi-conductor diode is longitudinally mounted vertically below the element, and is covered by a black circular-knit sleeve, of yarn having a low moisture-regain. The sleeve preferably has a diameter of about ⅜ of an inch and a length of about 1 inch. A pair of semi-conductor diodes are mounted parallel to each other horizontally below the single diode. A metal disc is centrally located about ½ inch above the pair of diodes, its upperside being a matte neutral shade of about the reflectivity of average terrain. Reflecting means is provided above the pair of diodes for shielding them from the sun, but allowing exposure to ambient air. Circuit means is provided for applying current to the bead transistor and the diodes, whereby currents are obtained and modified which are representative of the aforenoted expression.

More generally, the instrument comprises means for measuring the ambient air temperature and providing a first signal proportional to the temperature in degrees celsius, means for providing a second signal proportional to the nonevaporative rate of body heat loss in K Cal./in.² hr, and means for providing a third signal representative of the thermal insulation resistance of still air outside of clothing. Means is also included for measuring the fraction of full sunlight intensity reaching a person wearing the clothing, and for providing a fourth signal representative thereof, and further means for providing a fifth signal representative of the absorptance of the clothing. Further means adds the first signal to the product of the second and third signals and to the product of 230 and the third, fourth and fifth signals and subtracts the product of .18 and the second signal, thus providing an output signal, which is representative of the still shade temperature.

Figure 1A:
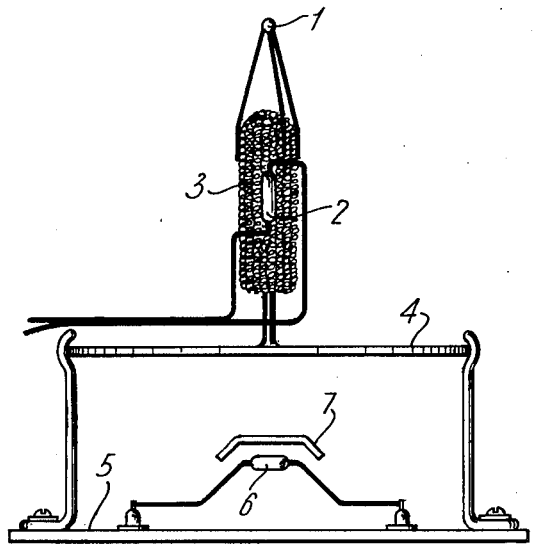
Figure 2:
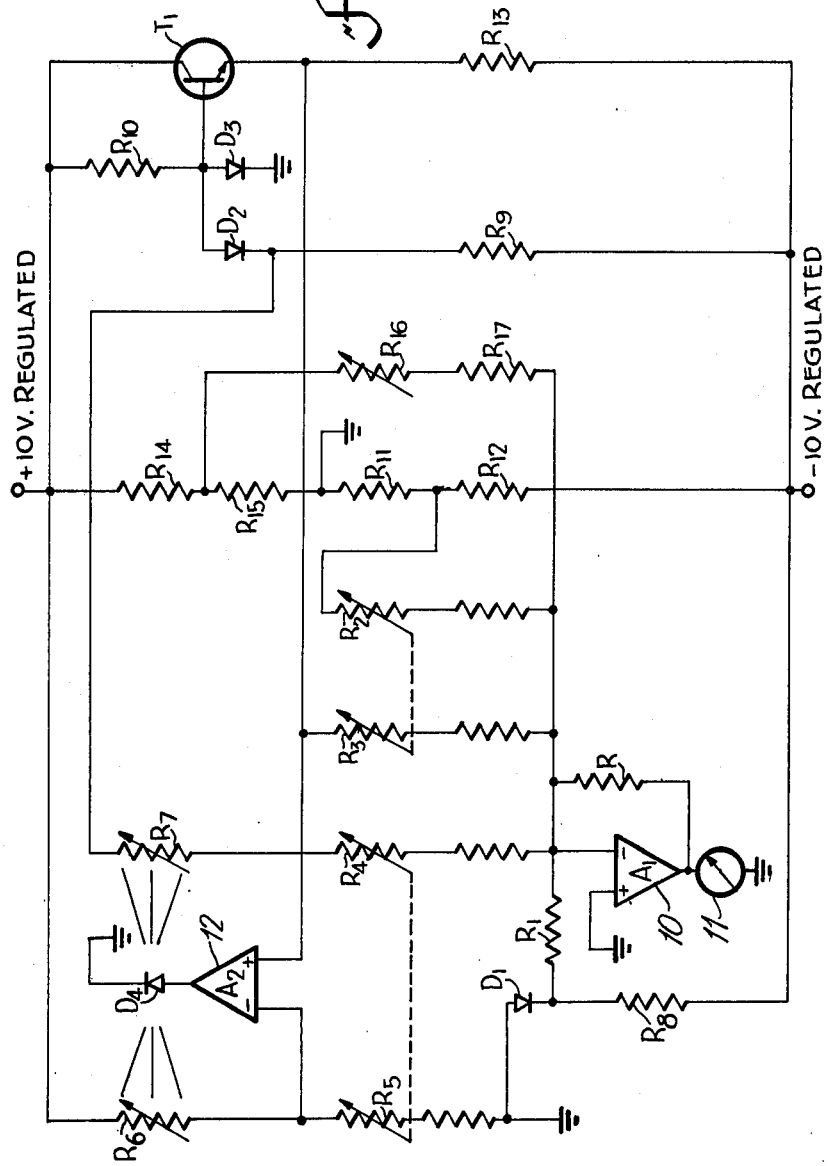
Figure 3:
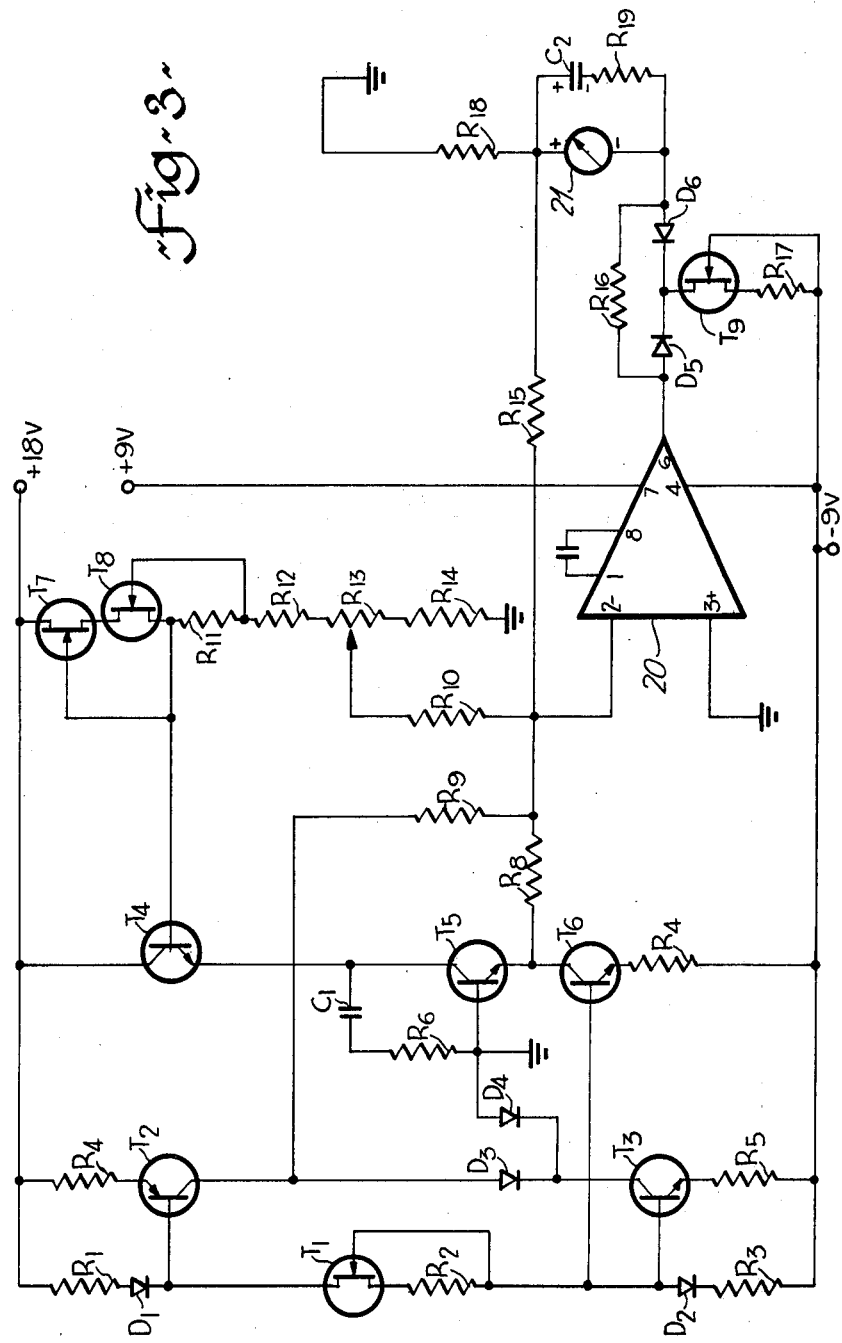

A better understanding of the invention will be obtained by reference to the description below, and the following drawings, in which:

FIG. 1A is a front elevation view of the detector head used with the circuit of FIG. 3, FIG. 1B is a front elevation view of the detector head according to the preferred embodiment of the invention, FIG. 2 is a schematic diagram of the circuit according to the preferred embodiment of the invention, and FIG. 3 is a schematic diagram according to an alternative form of the invention.

Turning first to FIG. 1A, a bead transistor 1 is shown. This is a transistor encapsulated in a small bead, and painted white to minimize solar heating. It is mounted with its full length leads (about 0.4 inch long) almost vertical, being spread slightly so as to form a wigwam frame with an equilateral triangle base. This construction is believed to offer similar heat transfer coefficient to the air irrespective of wind direction in the horizontal plane. In addition, it has been found that with this construction the temperature rise of the transistor above the ambient temperature is approximately proportional to the experimental values of the thermal resistance of the still air layer outside of clothing which is a function of wind velocity, and which characterizes heat loss from a human body.

Below the bead transistor 1 is located a single diode 2, with its long axis vertical. Surrounding the diode 2 is a black circular-knit sleeve 3. The yarn preferably has a low moisture regain, such as PHENTEX brand yarn, which sleeve has an outside diameter preferably of about ⅜ inch, and a length of about 1 inch. The sleeve 3 acts to enlarge the effective size of the diode, which increases the temperature elevation thereof in sunshine, and decreases the effect of wire shadows falling on it.

Below the diode 2 is a circular metal disc 4 preferably of aluminum and of about 3 inches diameter. Preferably, the underside is polished bare metal, and the top side is painted a matte neutral shade to match the reflectivity of average terrain. The aluminium plate is mounted about 1 inch above an aluminum base plate 5.

Mounted about half way between the base plate 5 and metal disc 4 is diode 6, which is disposed with its long axis horizontal. An inverted foil dish 7 mounted over the top of diode 6 shields it from ambient sunlight, but provides access to surrounding air.

Structural supports for the above have not been fully described, but are easily fabricated with the two criteria that interference with the sun and wind are to be kept to a minimum, and all wires are to be insulated from each other.

The structure of FIG. 1B is similar to that of FIG. 1A, except that the diode 2 and sleeve 3 are covered by an inverted test tube 8 which is about 1¼ inches in diameter. This prevents the wind from affecting the temperature obtained by diode 2. The bead transistor leads 1 are run outside the test tube walls. However in this case there are two side-by-side diodes 6 mounted similarly to diode 6 in FIG. 1a.

The circuit to be described below will be with reference to the detector head shown in FIG. 1B, the preferred embodiment. A modification will then be described whereby the detector head of FIG. 1A can be used. The component values noted were used in one example of a working model of the invention, but other values could be used to suit the design intent of other models.

Turning now to FIG. 2, a circuit is shown which provides an electrical analog signal for the still shade temperature $T_{ss}$, described earlier. Operational amplifier 10 is provided, having a positive input connected to ground, and an output connected through a 0 to 100 microammeter 11 to ground. The scale in the meter can be provided to read between −70° F to +30° F. A resistor R of 68,000 ohms, is connected between the output of the operational amplifier and its negative input.

In this description, the polarity of the voltages and currents, etc. can be reversed as is well known in the art, without departing from the invention.

In order to provide a current to the amplifier 10 corresponding to the ambient temperature $T_a$, a silicon diode D1 is connected with its anode to ground and its cathode through resistor R1 to the negative input of the operational amplifier. The cathode is also connected through a resistor R8 to a negative source of potential. Resistor R1 is 133,000 ohms, and resistor R8, 56,000 ohms. Diode D1 is one of the pair of diodes 6 described with reference to FIGS. 1A and 1B, shielded from the sun, but having access to the ambient air.

A current representative of the thermal insulation resistance of still air outside of clothing is provided by transistor T1, which, in this embodiment, can be an NPN transistor type D26C4. Transistor T1 is the bead transistor 1 referred to earlier. The emitter of the transistor is connected to the negative source of potential through a resistor R13, of 3,300 ohms. The collector of transistor T1 is connected to a positive source of potential. Its base is connected to ground through silicon diode D3, which has its anode connected to the base and its cathode to ground. Resistor R10 of 27,000 ohms. is connected between the base of transistor T1 and the source of positive supply. Diode D3 is the second of the pair of diodes 6 described earlier, which is temperature sensing but is hidden from sunlight.

Silicon diode D2 has its anode connected to the anode of diode D3, and is connected to the source of negative potential through a resistor R9 of 56,000 ohms. Diode D2 is the same as diode 2 described earlier, located within sleeve 3.

The emitter voltage of transistor T1 is found to vary during operation between, for instance, 0 and +30 millivolts. Potentiometer R3 connects the emitter to the negative input of operational amplifier 10. If desired, an additional resistor can be connected in series with potentiometer R3 to insure that the total resistance never reaches zero. Potentiometer R3 is about 200,000 ohms resistance.

Potentiometer R3 provides an adjustment corresponding to the non-evaporative rate of body heat loss. With the emitter voltage of transistor T1 providing a measure of the thermal insulation resistance of still air outside of the clothing, variation of resistor R3 provides the product $HI_a$ in current applied to the negative input of amplifier A1. A potentiometer R2, which is identical to potentiometer R3 and tracking therewith is also connected to the negative input of amplifier 10, and is provided by a source of current from resistors R11 and R12, a voltage divider between the source of negative potential and ground. Resistor R11 is 100 ohms and resistor R12 33,000 ohms. Since the potential applied to potentiometer R2 is negative, the function $-.18H$ is thus provided as a negative current to the negative input of amplifier 10.

The functions $T_a$, $-.18H$, and $HI_a$ are thus obtained.

Diode D2, as noted earlier, is exposed to the sun. The potential at its cathode is therefore a function of the sunlight intensity reaching it, and is not affected by the wind, since diode D2 is housed within the test tube glass wind barrier. In order to multiply the thermal insulation resistance equivalent voltage by the just-mentioned sunlight intensity value, the thermal insulation resistance voltage from the emitter of transistor T1 is applied to the positive input of a second operational amplifier 12. The cathode of diode D2 is serially connected through a photoresistor R7, such as type CL903N, and through potentiometer R4 to the negative input of amplifier A1.

A second photoresistor R6 identical to photoresistor R7 is serially connected with potentiometer R5 from the source of positive potential to ground. Potentiometer R5 is identical to, and tracks with potentiometer R4. Each is representative of the variable $\alpha$, the absorptance of clothing. The negative input of second operational amplifier 12 is connected to the junction of potentiometer R5 and photoresistor R6.

In operation, the resistance of potentiometer R5 (likewise R4) is set to be inversely proportional to the clothing absorptance by means of an inverse scale. The output of operational amplifier 12 is connected to light emitting diode D4, of type SSL-22 which illuminates equally photoresistors R6 and R7 whose resistance will therefore decrease if the positive input of operational amplifier 12 is made more positive or if the negative input is made more negative. The result of such variation of resistance in R6 is to cause the potential of the negative input of operational amplifier 12 to follow that of the positive input. In consequence the sum of resistances R5 and R6 (and likewise R4 and R7) is automatically maintained proportional to R5 and inversely proportional to the thermal insulation resistance signal from the emitter of transistor T1. The current flowing through R4 to the negative input of amplifier 10 is proportional to the signal voltage on the cathode of diode D2 and inversely proportional to the sum of R4 and R7. Said current is therefore proportional to the product of the three quantities: clothing absorptance, intensity of solar radiation, and thermal insulation resistance of the air outside of the clothing and represents the final term $230\tau\alpha I_a$.

The summation of all four currents described earlier is displayed in meter 11 which is usefully calibrated in degrees of temperature.

A bias adjustment for operational amplifier 10 is provided by the series of resistors R14 and R15 connected between the source of positive potential and ground, their junction being connected through a potentiometer R16 in series with resistor R17 which is connected to the negative input of amplifier 10. R14 is 100,000 ohms; R15, 4750 ohms; R17, 68,000 ohms; and potentiometer R16, 20,000. Potentiometer R16 is varied to set the net bias to zero.

For operation, the detector head is located in an exposed location, and the two controls consisting of potentiometers R4, R5 and R2, R3 are set to predetermined values corresponding respectively to clothing absorptance and the non-evaporative rate of body heat loss. The resulting still shade temperature is then read on meter 11 in degrees. It has been found that the displayed still shade temperature using this invention is extremely close to the calculated values, except at very low wind levels. The instrument has been found to be quite accurate at wind levels between 100 feet per minute and over 1000 feet per minute.

In another embodiment, a circuit is provided which eliminates the second operational amplifier 12. The detector head used is that of FIG. 1A, rather than FIG. 1B, resulting in diode 2 and sleeve 3 being exposed to the wind. It has been found that the density and thickness of the knitting can be varied in order to have the temperature rise of diode 2 due to solar heating vary with the wind velocity in the correct manner, that is, about proportional to the thermal insulation resistance of still air outside of clothing.

A successful type of sleeve for this function was knit on a device made by attaching four 1½ inch finishing nails to a ⅜ inch outside diameter brass tube. The nails were fixed parallel to the axis of the tubing, uniformly spaced on its outer surface, with their heads projecting 5/16 inch beyond the end of the tubing. A stitch was held on each nail and as the knitted sleeve got longer, it hung down the inside of a brass tube. To make a new stitch, the free yarn was laid across the next nail above the stitch already there and was held while the latter was lifted up over the head of the nail and dropped. The yarn used was three ply back PHENTEX. The result was a dense knitted structure with a very firm well-defined surface. When pulled over the diode, it was 5/16 inch outside diameter and 1 inch long. It was found that proportionality of solar heating with $I_a$ held within ±7% over the range of wind velocities of 125 feet per minute to 700 feet per minute.

The second circuit described with reference to FIG. 3 has the value H, the non-evaporative rate of body heat loss as well as $\alpha$, the absorptance of clothing, as constants of a standard activity level and clothing colour respectively. For instance, we can place H at 100 which represents light to moderate work, and $\alpha$ at 0.435, which represents medium coloured clothing. The equation for the still shade temperature in degrees Celsius then reduces to
$$T_{ss} = T_a - 18 + 100 I_a(1+\tau)$$

Referring now to FIG. 3, operational amplifier 20 provides a summing function similar to operational amplifier 10 in FIG. 2. Its positive input is grounded, and its negative input is a terminal for the acceptance of currents to be summed. In this case the meter 21 is connected in the feedback path between the output of amplifier 20, through resistor R15 which is 100,000 ohms, to the negative input of amplifier 20.

It should be noted that variations of current or potential sources in these circuits will result in an erroneous output reading on meter 11 or 21. For that reason the sources should be regulated to maintain very nearly constant current or constant voltage.

Bead transistor T5, which is transistor 1 in FIG. 1A, is used to sense both ambient temperature $T_a$ and wind (100 $I_a$). The emitter of transistor T5 is connected through the collector-emitter circuit of transistor T6, which maintains the emitter current of transistor T5 constant. The base of transistor T5 is grounded, and resistor R6 and capacitor C1, which are serially connected between the base and collector of transistor T5, are for the purpose of suppressing parasitic oscillations which have been found to sometimes occur when the leads to transistor T5 are more than an inch or two long. Resistor R6 is 100 ohms and capacitor C1, 1000 picofarads. The emitter resistor of transistor T6 to negative supply, R7, can be 1400 ohms. Transistor T6 is a type 2N5232.

The collector of transistor T5 is connected through the emitter-collector circuit of transistor T4 to a positive source of supply of +18 volts. Transistor T4 supplies a constant collector to emitter voltage to bead transistor T5, since the two base to emitter voltages are the same. Transistor T4 is also of type 2N5232. A regulated potential of +10 volts is supplied to the base of transistor T4.

The emitter of transistor T5 is connected to the negative input of operational amplifier 20 through resistor R8, of 100,000 ohms. This provides the value $T_a + 100 I_a$. Remaining to complete the expression for $T_{ss}$ are currents representative of a constant $-18$ and $100 I_a\tau$, the latter of which is the solar radiation signal.

The solar radiation signal is provided by diodes D3 and D4. Diode D4 has its anode connected to ground, and its cathode to the cathode of diode D3. Both diodes are of FD-300 type. Diode D3 is shaded, as element 6 in FIG. 1A, while diode D4 is exposed under the sleeve, as diode 2 in the same figure.

The anode of diode D3 is connected to the collector of transistor T2, which has its emitter connected through resistor R4 (of 22,000 ohms), to a positive source of supply. The junction of the cathodes of diodes D3 and D4 is connected to the collector of transistor T3, which has its emitter connected through resistor R5 to a negative source of supply, −9 volts. Resistor R5 is 11,000 ohms. Transistors T2 and T3 act as constant current sources which supply the temperature measuring diodes D3 and D4. Transistor T2 is a PNP TYPE 2N5087, while transistor T3 is an NPN type 2N5232.

The bases of transistors T2 and T3 are supplied from transistor T1 which provides reference voltages, respectively connected through diodes D1 and D2 to the positive and negative voltage supplies. Transistor T1 is of field effect type 2N5457, and has its drain connected through the cathode-anode circuit of diode D1, through resistor R1 of 12,000 ohms to the +18 volt supply. The source of transistor T1 is connected through resistor R2, of 3,900 ohms, through the anode-cathode circuit of diode D2, and through resistor R3, of 12,100 ohms, to the −9 volt supply. The gate of transistor T1 is connected to the anode of diode D2, as is the base of transistor T3. The base of transistor T2 is connected to the cathode of diode D1. The base of transistor T6 is also connected to the anode of diode D2.

In operation, it may be seen that since diode D3 is shaded from the sun, and diode D4 is exposed both to sun and wind, the potential at the anode of diode D3 is differentially affected, resulting in a change in electric potential thereat. The anode of diode D3 is connected through resistor R9 to the negative input of operational amplifier 20. Resistor R9 is preferably 100,000 ohms in the present circuit. Since the current applied therethrough is representative of 100 $I_a\tau$, the solar radiation signal, this factor is also summed by operational amplifier 20.

The remaining factor is an offset current, which is provided through potentiometer R13, which is in a voltage divider comprising resistors R11, R12, R13, and R14 with field effect transistors T7 and T8. Resistor R14 is connected to ground, and the control tap on resistor R13 is connected through resistor R10, of 100,000 ohms, to the negative input of operational amplifier 20.

Transistors T7 and T8 are serially connected, with the drain of transistor T8 connected to the source of transistor T7, and the drain of transistor T7 connected to the positive source of potential, +18 volts. The gate of transistor T7 is connected to the source of transistor T8, which together supply a regulated current through R11, R12, R13 and R14 resulting in a potential of +10 volts at the base of transistor T4. The gate of transistor T8 is connected to the junction of resistors R11 and R12, the other end of resistor R11 being connected to the source of transistor T8. Resistor R11 is 3,800 ohms, resistor R12, 20,000 ohms, resistor R13, 100 ohms, and resistor R14, 1,910 ohms. It is preferred that resistors R11, R12, R14, and R10 be of 1% tolerance. Transistors T1, T7, and T8 are of 2N5457 type. The meter zero or offset adjustment is by variation of potentiometer R13.

The junction of meter 21 and resistor R15 is connected to ground through resistor R18, 1,180 ohms. The meter, 0–100 microamperes, is by-passed by the series combination of resistor R19 and capacitor C2, respectively 680 ohms and 300 microfarads. The meter is located within the negative feedback loop, rather than the load circuit of operational amplifier 20, since this substantially eliminates error due to its temperature coefficient of resistance. All resistors except R6, R13, R16, R17 and R19 are preferred to be nickel-chrome film resistors for good temperature coefficient of resistance. Resistor R19 and capacitor C2 provide meter damping without loss of sensitivity.

In order to protect the meter from gross overload in case of a fault, field effect transistor T9 of type 2N5457 is provided in the output circuit of operational amplifier 20. A pair of diodes D5 and D6 are connected cathode to cathode, and shunted anode to anode by resistor R16, of 1.2 megohms. One anode is connected to the operational amplifier output, and the other is connected to meter 21. The junction of the diode cathodes is connected through the source-drain circuit of transistor T9, which is connected to the negative potential source −9 volt through resistor R17, of 6,800 ohms. The gate of transistor T9 is connected to the negative potential source directly.

The source resistor R17 is selected to give a current of about 150 microamperes in transistor T9, which together with diodes D5 and D6 provides the aforenoted protection. Resistor R16 allows some deflection of the meter in the negative direction.

Wind sensitivity is controlled by resistor R7, and radiation sensitivity by resistor R9. It was found that the ambient temperature response of the bead transistor T5 (of type D26C4) was 1.18 millivolts per degree fahrenheit at 3.0 milliamperes emitter current, which is almost identical to the average response of the diodes D3 and D4 (of type FD-300), 1.19 millivolt per degree fahrenheit, at 0.16 milliamps.

The instrument built according to the circuit of FIG. 3 was found to be easy to use, providing a direct reading of the still shade temperature, without the necessity of adjustments as required in the circuit of FIG. 2.

A person skilled in the art after reading this specification may now derive additional alternatives or variations of the invention. All are considered to be within the scope of the invention as defined by the appended claims.

The embodiments of the invention in which an exclusive property or privilege is claimed are defined as follows:

1. A still shade temperature measuring instrument comprising:
   (i) a bead transistor element mounted for exposure to the sun and wind,
   (ii) a first semiconductor diode longitudinally mounted vertically below said element, covered by a black circular-knit sleeve, of yarn having a low moisture-regain, the sleeve having a diameter of about ⅜ inches and a length of about 1 inch,
   (iii) at least one second semiconductor diode mounted horizontally below the first diode,
   (iv) a metal disc centrally located about ½ inch above the second diode, for shielding the second diode from the sun, but allowing exposure to ambient air, and
   (v) circuit means for applying current to the bead transistor element and to the diodes whereby voltages are obtained and modified representative of the expression $T_{ss} = T_a - 0.18H + HI_a + 230\tau\alpha I_a$ where $T_{ss}$ is an output signal representative of the still shade temperature in degrees Celsius,
   $T_a$ is representative of the ambient temperature in degrees Celsius,
   $H$ is representative of the non-evaporative rate of body heat loss in KCal/m² hr.,
   $I_a$ is representative of the thermal insulation resistance of still air outside of clothing in degrees C m²hr/KCal.,
   $\tau$ is representative of the sunlight intensity, and
   $\alpha$ is representative of the absorptance of clothing, and means for obtaining an output signal from the circuit means having the value $T_{ss}$.

2. A still shade temperature measuring instrument as defined in claim 1, in which the metal disc has an upper surface which is matte neutral shade of about the reflectivity of average terrain, and a reflective lower surface.

3. A still shade temperature measuring instrument as defined in claim 2, further comprising:
 (a) means for providing a first voltage representative of the ambient temperature ($T_a$),
 (b) means for providing a second voltage representative of the thermal insulation resistance of still air outside of clothing ($I_a$),
 (c) second voltage modifying means for modifying the second voltage proportionally to the non-evaporative rate of heat loss of a body (H) to provide a third voltage,
 (d) fourth voltage providing means for providing a fourth voltage proportional to the intensity of ambient sunlight ($\tau$), and the thermal insulation resistance of still air outside of said clothing and modifying it proportionally to the absorptance of said clothing ($\alpha$),
 (e) means for providing a fifth voltage proportional to the non-evaporative rate of heat loss of a body within the cothing, and
 (f) first summing means for summing the first voltage, the third voltage, the fourth voltage, and the fifth voltage and applying the sum to a meter to provide an output reading ($T_{ss}$).

4. An instrument as defined in claim 3, further including a transparent wind-impermeable housing spaced from, and enclosing said first semiconductor diode and sleeve.

5. A still shade temperature measuring instrument as defined in claim 2 further comprising
 (a) means for generating a first current proportional to the ambient temperature,
 (b) means for providing a first potential proportional to the thermal insulation resistance of still air outside of clothing,
 (c) a first pair of identical ganged and tracking variable resistance means both of which are adjustable to be inversely proportional to the non-evaporative rate of heat loss of a human body,
 (d) first potential applying means for applying the first potential across one of the pair of resistance means to provide a second current,
 (e) means for applying a fixed potential across the other of the pair of resistance means to provide a third current,
 (f) means for providing a second potential proportional to the intensity of ambient sunlight,
 (g) a second pair of resistance means each of which is adjustable to be inversely proportional to the absorptance of said clothing,
 (h) a photoconductive cell
 (i) second potential applying means for applying the second potential proportional to the intensity of the ambient sunlight to the series combination of one of the resistance means of the second pair of resistance means and the photoconductive cell,
 (j) total resistance varying means for varying the total resistance of the said series combination so as to keep it proportional to the quotient of the resistance of said one of the second pair of resistance means divided by the first potential to provide an output fourth current proportional to the product of the intensity of ambient sunlight, the absorptance of clothing, and the thermal insulation resistance of still air outside of clothing,
 (k) means for summing the first, the second, a proportion of the third and the fourth currents together and passing the sum through a meter to provide an output reading.

6. A still shade temperature measuring instrument as defined in claim 5, in which
 (i) the summing means comprises an operational amplifier, having its positive input connected to ground, its output connected to an output meter which is also connected to ground, and a first feedback resistor connected between its output and its second negative input;
 (ii) the means for generating a first current proportional to the ambient temperature comprises a pair of said second diodes mounted parallel to each other, one connected with its anode to ground and its cathode through a second resistor to the second input of the operational amplifier; further including a third resistor connected from the cathode of said one of said pair of second diodes to a source of negative potential;
 (iii) the means for providing a first potential proportional to the thermal insulation resistance of still air outside of clothing comprises an NPN bead transistor mounted for exposure to the sun and wind having its emitter connected to negative potential through a fourth resistor and its collector connected to positive potential, and its emitter connected through one of the first pair of resistance means to the second input of the operational amplifier, and
 (iv) the means for applying a fixed potential across the other of the pair of resistance means comprises a resistance voltage divider connected between the negative supply and ground, the tap thereof being connected through the second of the first pair of resistance means to the second input of the operational amplifier.

7. A still shade temperature sensing instrument as defined in claim 6, in which
 the second potential applying means and the total resistance varying means comprises a third diode, connected between the base of the transistor and ground, with its cathode connected to ground, a fifth resistor connected between the base and a source of positive supply, a fourth diode having its anode connected to the anode of the third diode; a second operational amplifier having its output connected through a light emitting diode to ground; an identical pair of photosensitive resistors coupled to the light emitting diode, each photosensitive resistor being connected in series with a respective one of a pair of identical ganged and tracking potentiometers, one of the photosensitive resistors being connected to the source of positive potential, and its associated potentiometer being also connected to ground at its other outer terminal, their junction being connected to the negative input of the second operational amplifier; the positive input of the second operational amplifier being connected to the emitter of the transistor; the other photosensitive resistor being connected to the cathode of the fourth diode, and also to the source of negative potential through a fifth resistor, the associated potentiometer being connected to the negative input of the first operational amplifier.

8. A still shade temperature measuring instrument as defined in claim 3 including means for causing a fourth current resulting from the fourth voltage providing means to vary both proportionally to the intensity of the ambient sunlight and to the thermal insulation resistance of still air outside of human clothing.

9. A still shade temperature measuring instrument as defined in claim 8, in which the last-named means is comprised of said first semiconductor diode, the sleeve being uncovered and exposed to the sunlight and wind with the semiconductor bead element.

10. A still shade temperature measuring instrument as defined in claim 9, in which the current change resulting from variation of the second voltage modifying means is held constant, and the change in current resulting from variation of the fourth voltage providing means proportional to the absorptance of clothing is held constant.

11. A still shade temperature measuring instrument as defined in claim 10, in which
the first summing means is comprised of an operational amplifier, having its positive input connected to ground, further comprising a bead transistor for providing a current representative of ambient temperature ($T_a$) and wind ($100I_a$) having its collector and emitter connected by constant voltage and constant current sources respectively, including means for varying the constant current source to provide a wind sensitivity adjustment; the emitter being connected through a resistor to the negative input of the operational amplifier; a pair of diodes for providing a current representative of solar radiation ($100I_a\tau$), having their cathodes connected together to a constant current source, one of the diodes, being said first diode, having its anode connected to ground, the other of the diodes, being said second diode, having its anode connected both to a constant current source and to a resistor which is further connected in series to the negative input of the operational amplifier, and an output current displaying device connected to the output of the operational amplifier.

12. A still shade temperature measuring instrument comprising:
(a) means for measuring the ambient air temperature and providing a first signal proportional to the temperature,
(b) means for providing a second signal representative of the non evaporative rate of body heat loss,
(c) means for providing a third signal representative of the thermal insulation resistance of still air outside of clothing,
(d) means for measuring the sunlight intensity reaching a person wearing the clothing, and providing a fourth signal representative thereof,
(e) means for providing a fifth signal representative of the absorptance of the clothing, and
(f) means for adding the first signal to the product of the second and third signals and the product of 230 and the third, fourth and fifth signals and subtracting the product of 0.18 and the second signal, and for providing an output signal, which is representative of the still shade temperature in degrees Celsius.

13. A still shade temperature measuring instrument comprising:
(a) means for measuring the ambient air temperature and providing a first signal proportional to the temperature,
(b) means for providing a second signal representative of the non-evaporative rate of body heat loss,
(c) means for providing a third signal representative of the thermal insulation resistance of still air outside of clothing,
(d) means for measuring the sunlight intensity reaching a person wearing the clothing, and providing a fourth signal representative thereof,
(e) means for providing a fifth signal representative of the absorptance of the clothing, and
(f) means for adding the first signal to the product of the second and third signals and the product of a first factor and the third, fourth and fifth signals and subtracting the product of a second factor and the second signal, and for providing an output signal, which is representative of the still shade temperature.

* * * * *